US008215900B2

(12) United States Patent
Morrison

(10) Patent No.: US 8,215,900 B2
(45) Date of Patent: Jul. 10, 2012

(54) TURBINE VANE WITH HIGH TEMPERATURE CAPABLE SKINS

(75) Inventor: Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 979 days.

(21) Appl. No.: 12/204,115

(22) Filed: Sep. 4, 2008

(65) Prior Publication Data

US 2010/0054930 A1 Mar. 4, 2010

(51) Int. Cl.
*F01D 5/14* (2006.01)
*F03D 11/00* (2006.01)
*F04D 29/38* (2006.01)

(52) U.S. Cl. ....................................... 415/115; 416/97 A

(58) Field of Classification Search .............. 415/1, 115, 415/191, 208, 208.1; 416/97 A, 97 R
See application file for complete search history.

(56) References Cited

U.S. PATENT DOCUMENTS 3,669,177 A 6/1972 Ingalls et al.
3,732,031 A 5/1973 Bowling et al.
3,878,880 A 4/1975 Jones
4,008,052 A 2/1977 Vishnevsky et al.
4,063,851 A * 12/1977 Weldon ........................ 416/97 A
4,183,716 A * 1/1980 Takahara et al. ............ 416/96 A
4,195,683 A 4/1980 Blazek
4,257,734 A * 3/1981 Guy et al. ...................... 415/115
4,370,789 A 2/1983 Schilke et al.
4,446,199 A 5/1984 Gedwill et al.
4,489,469 A 12/1984 Hall
4,494,287 A 1/1985 Cruzen et al.
4,538,331 A 9/1985 Egan et al.
4,592,120 A 6/1986 Egan et al.
4,728,258 A 3/1988 Blazek et al.
4,869,645 A 9/1989 Verpoort
4,955,423 A 9/1990 Blazek
4,961,459 A 10/1990 Blazek
4,987,944 A 1/1991 Parks
5,069,265 A 12/1991 Blazek et al.
5,181,550 A 1/1993 Blazek et al.
5,241,737 A 9/1993 Colvin
5,241,738 A 9/1993 Colvin
5,263,530 A 11/1993 Colvin
5,264,011 A 11/1993 Brown et al.
5,290,143 A 3/1994 Kington et al.
5,332,022 A 7/1994 Colvin
(Continued)

FOREIGN PATENT DOCUMENTS

GB 2 049 068 A 12/1980
(Continued)

*Primary Examiner* — Sheila V Clark

(57) ABSTRACT

A turbine vane assembly includes an airfoil extending between an inner shroud and an outer shroud. The airfoil can include a substructure having an outer peripheral surface. At least a portion of the outer peripheral surface is covered by an external skin. The external skin can be made of a high temperature capable material, such as oxide dispersion strengthened alloys, intermetallic alloys, ceramic matrix composites or refractory alloys. The external skin can be formed, and the airfoil can be subsequently bi-cast around or onto the skin. The skin and the substructure can be attached by a plurality of attachment members extending between the skin and the substructure. The skin can be spaced from the outer peripheral surface of the substructure such that a cavity is formed therebetween. Coolant can be supplied to the cavity. Skins can also be applied to the gas path faces of the inner and outer shrouds.

20 Claims, 6 Drawing Sheets

U.S. PATENT DOCUMENTS

| | | | | |
|---|---|---|---|---|
| 5,332,360 | A | 7/1994 | Correia et al. | |
| 5,359,770 | A | 11/1994 | Brown et al. | |
| 5,377,742 | A | 1/1995 | Jarry | |
| 5,678,298 | A | 10/1997 | Colvin et al. | |
| 5,712,050 | A | 1/1998 | Goldman et al. | |
| 5,797,725 | A | 8/1998 | Rhodes | |
| 5,975,852 | A | 11/1999 | Nagaraj et al. | |
| 5,981,083 | A | 11/1999 | Colvin et al. | |
| 6,168,874 | B1 | 1/2001 | Gupta et al. | |
| 6,235,370 | B1 | 5/2001 | Merrill et al. | |
| 6,386,827 | B2 * | 5/2002 | Yu et al. | 415/136 |
| 6,409,473 | B1 | 6/2002 | Chen et al. | |
| 6,455,167 | B1 | 9/2002 | Rigney et al. | |
| 6,482,537 | B1 | 11/2002 | Strangman et al. | |
| 6,485,845 | B1 | 11/2002 | Wustman et al. | |
| 6,508,620 | B2 * | 1/2003 | Sreekanth et al. | 415/115 |
| 6,586,115 | B2 | 7/2003 | Rigney et al. | |
| 6,638,639 | B1 | 10/2003 | Burke et al. | |
| 6,767,659 | B1 | 7/2004 | Campbell | |
| 6,811,894 | B2 | 11/2004 | Narasimhan et al. | |
| 6,887,589 | B2 | 5/2005 | Darolia et al. | |
| 6,908,288 | B2 | 6/2005 | Jackson et al. | |
| 6,979,498 | B2 | 12/2005 | Darolia et al. | |
| 7,045,220 | B2 | 5/2006 | Ishiduka et al. | |
| 7,172,820 | B2 | 2/2007 | Darolia et al. | |
| 7,284,590 | B2 | 10/2007 | Liimatainen | |
| 2001/0021343 | A1 * | 9/2001 | Kuwabara et al. | 415/115 |
| 2003/0068222 | A1 * | 4/2003 | Cunha et al. | 415/115 |
| 2005/0091848 | A1 * | 5/2005 | Nenov et al. | 29/889.1 |
| 2006/0239825 | A1 | 10/2006 | Rice et al. | |
| 2010/0054932 | A1 * | 3/2010 | Schiavo | 415/200 |

FOREIGN PATENT DOCUMENTS

| | | |
|---|---|---|
| JP | 59-065596 | 4/1984 |

* cited by examiner

TURBINE VANE WITH HIGH TEMPERATURE CAPABLE SKINS

STATEMENT REGARDING FEDERALLY SPONSORED DEVELOPMENT

Development for this invention was supported in part by Contract No. DE-FC26-05NT42646 awarded by the United States Department of Energy. Accordingly, the United States Government may have certain rights in this invention.

FIELD OF THE INVENTION

Aspects of the invention relate in general to turbine engines and, more particularly, to turbine vanes in the turbine section of a turbine engine.

BACKGROUND OF THE INVENTION

During the operation of a turbine engine operation, high temperature, high velocity gases flow through alternating rows of stationary vanes and rotating blades in the turbine section. Turbine vanes must be cooled in order to withstand the high temperature environment. Turbine vanes have been coated with thermal barrier coatings to minimize the amount of cooling required. However, even with a thermal barrier coating, the turbine vane still requires active cooling to prevent it from overheating and burning up. Such active cooling involves systems are usually complicated and costly. Further, the use of air to cool the vane detracts from the use of such air for other beneficial purposes in the engine. In many engine designs, demands to improve engine performance have been met in part by increasing engine firing temperatures, thereby further challenging the material capabilities of the vanes and further increasing cooling requirements. Therefore, there is a need for a vane system that can minimize such concerns.

SUMMARY OF THE INVENTION

Aspects of the invention are directed to a turbine vane. The vane includes an inner shroud, an outer shroud, and an airfoil extending between the inner and outer shrouds. The inner shroud can have a gas path face, and the outer shroud can have a gas path face. The airfoil has an inner end region and an outer end region. The airfoil transitions to the inner shroud in the inner end region, and the airfoil transitions to the outer shroud in the outer end region. In one embodiment, the inner shroud and the outer shroud can be made of a first half shroud and a second half shroud. In such case, the first half shroud and the second half shroud can collectively engage and mechanically interlock a respective one of the end regions of the airfoil.

The airfoil includes a substructure and an external skin attached to the substructure by a plurality of attachment members that extend between the substructure and the skin. Each attachment member can interlockingly engage the substructure and/or the skin. The external skin can cover at least a portion of the substructure. In one embodiment, the external skin can cover only a leading edge region of the airfoil. An external skin can be attached to the inner shroud and/or the outer shroud as well. In such case, the gas path face of the respective shroud is at least partially covered by the external skin.

The external skin can be made of an oxide dispersion strengthened alloy, a refractory alloy, an intermetallic alloy or a ceramic matrix composite material. The skin can be made of a material that has a higher melting point than the material of the substructure. At least a portion of the skin can be coated with a thermal barrier coating or an environmental barrier coating.

The external skin can be made of a plurality of skin segments. One of the plurality of skin segments can cover a leading edge region of the airfoil. When there is a plurality of skin segments, at least two of the skin segments can substantially adjacent to each other so that a seam is defined them. The seam can be elongated in the generally radial direction. An end of a first attachment member of a first skin segment and an end of a second attachment member of a second neighboring skin segment can be received together in a common recess in the skin and/or the substructure.

Each of the skin segments can have an associated thickness. The thickness of the skin segment that covers a leading edge region of the airfoil can be greater than the thickness of the other skin segments. One or more passages can extend through the thickness of the skin segment that covers the leading edge region of the airfoil.

The external skin can be spaced from the substructure such that a cavity is formed between them. The substructure can have a hollow interior. One or more passages can extend through the substructure so as to be in fluid communication with both the cavity and the hollow interior.

In one embodiment, the attachment members can be protrusions that extend from an inner surface of the skin. Each protrusion can have an end that interlockingly engages the substructure. For instance, the substructure can have a recess to receive the end of the protrusion. Alternatively, the attachment members can be protrusions extending from an inner surface of the substructure. Each protrusion can have an end that interlockingly engages the skin. For instance, the skin can have a recess to receive the end of the protrusion. In still another embodiment, the attachment members can be connectors that are separate from the skin and the substructure. Each connector can have a first end and a second end, which are opposite each other. The first end can interlockingly engage the skin, and the second end can interlockingly engage the substructure.

In another respect, aspects of the invention are directed to a turbine vane having an inner shroud, an outer shroud, and an airfoil extending between the inner and outer shrouds. Each of the shrouds has a gas path face. The airfoil has an inner end region and an outer end region. The airfoil transitions to the inner shroud in the inner end region. The airfoil also transitions to the outer shroud in the outer end region. An external skin is attached to the inner shroud and/or the outer shroud such that the gas path face of the respective shroud is at least partially covered by the external skin. The external skin can be spaced from the gas path face such that a cavity is formed therebetween. The external skin and the substructure can be joined by a plurality of attachment members extending therebetween. Each attachment member can interlockingly engage the respective shroud (the inner shroud, the outer shroud or both shrouds) and/or the external skin Aspects of the invention are also directed to a method of making an airfoil. The method involves forming an airfoil skin. Subsequently, a metal airfoil substructure is bi-cast onto and in engagement with the skin. A similar method can be employed to form a vane shroud.

DETAILED DESCRIPTION OF EMBODIMENTS OF THE INVENTION

Embodiments of the invention are directed to a turbine vane assembly that can accommodate the use of high temperature capable materials. Embodiments of the invention are shown in FIGS. 1-10, but the present invention is not limited to the illustrated structure or application.

Figure 1:
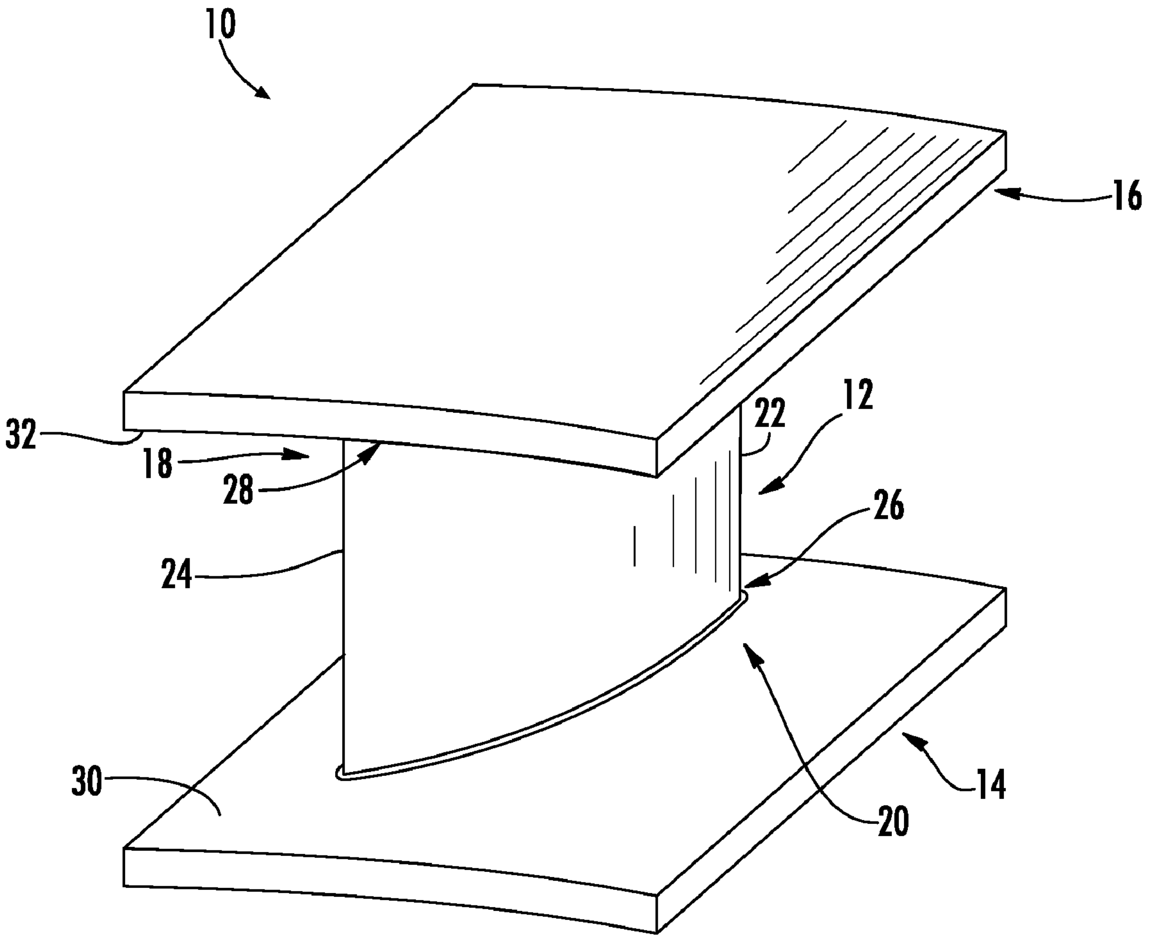
FIG. 1 is a perspective view of a turbine vane according to aspects of the invention.

FIG. 1 shows a turbine vane 10 according to aspects of the invention. As shown, the turbine vane 10 includes an airfoil 12, an inner shroud 14 and an outer shroud 16. The airfoil 12 has a pressure side 18 and a suction side 20. Further, the airfoil 12 has a leading edge 22 and a trailing edge 24. The airfoil 12 can have an inner end region 26 and an outer end region 28. The terms “inner” and “outer,” as used herein, are intended to mean relative to the axis of the turbine when the vane 10 is installed in its operational position. The inner shroud 14 can have a gas path face 30, which is directly exposed to the turbine gas flow path. Similarly, the outer shroud 16 can have a gas path face 32, which is also directly exposed to the turbine gas flow path.

Each end region 26, 28 of the airfoil 12 can transition into a respective one of the shrouds 14, 16. The airfoil 12 can be generally centered on each of the shrouds 14, 16, such as shown in FIG. 1. Alternatively, the airfoil 12 can be offset from the center of one or both shrouds 14, 16 in any of a number of ways, including where the outer and/or inner shroud 14, 16 is formed almost entirely on the suction side 20 or the pressure side 18 of the airfoil 12. However, it will be understood that aspects of the invention can be used in connection with almost any arrangement or relationship between the airfoil 12 and the shrouds 14, 16.

The airfoil 12 can be unitary with the shrouds 14, 16, or the airfoil 12 and the shrouds 14, 16 can be separate pieces. In one embodiment in which the airfoil 12 and shrouds 14, 16 are separate, at least one of the shrouds 14, 16 can be made of two pieces, which collectively engage the airfoil 12.

Figure 2:
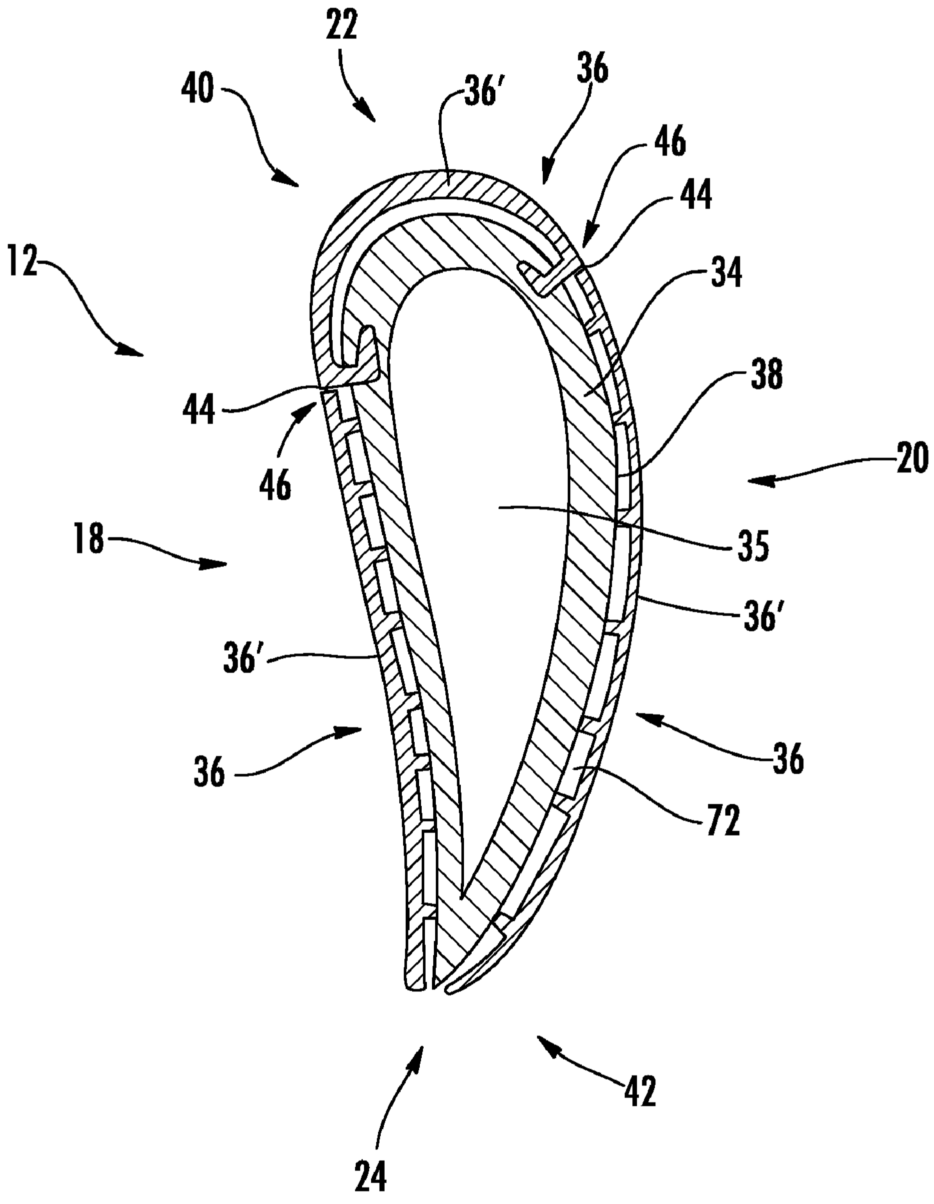
FIG. 2 is top plan cross-sectional view of an airfoil portion of a turbine vane according to aspects of the invention.
Figure 3:
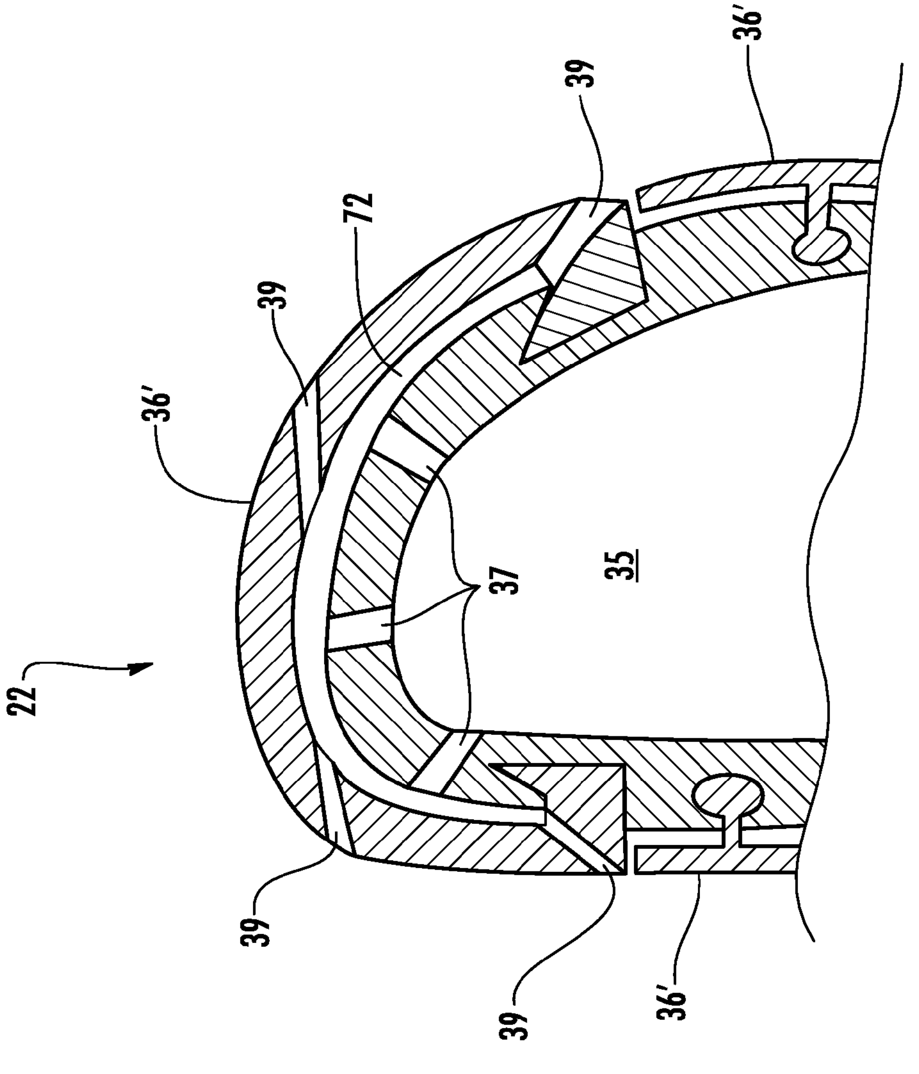
FIG. 3 is top plan cross-sectional view of an leading edge region of an airfoil portion of a turbine vane according to aspects of the invention, showing passages in an external skin and an internal substructure.

According to aspects of the invention, the airfoil 12 can include a substructure 34 and an external skin 36, as shown in FIGS. 2 and 3. The substructure 34 can provide the structural strength to the airfoil 12. The substructure 34 can be generally airfoil shaped. The substructure 34 can have an outer peripheral surface 38. The substructure 34 can be substantially solid, or it can be hollow in which case it can have an open interior 35. One or more passages can extend in the substructure 34. For instance, one or more passages 37 (FIG. 3) can extend through the substructure 34 so as to be in fluid communication with the hollow interior as well as cavity 72 formed between the substructure 34 and the skin 36, which is described in more detail later. The passages 37 can have any appropriate size and cross-sectional shape. The passages 37 can extend at any suitable angle. Any number of passages 37 can be provided, and the passages 37 can be provided in any suitable location; In the case of multiple passages 37, the passages can be substantially identical, or at least one passage 37 can be different from the other passages 37 in one or more respects.

The substructure 34 can be made of metal, such as a nickel-based superalloy. The substructure 34 can be made of a high strength material. In one embodiment, the material of the substructure 34 can withstand at least about 600 degrees Celsius. The substructure 34 can be formed in any suitable manner, including, for example, by casting, as will be described in more detail later.

The external skin 36 can cover at least a portion of the outer peripheral surface 38 of the substructure 34. The external skin 36 can be made of a single piece, or it can be made of a plurality of skin segments 36'. The skin segments 36' can be elongated in the generally radial direction. The term “radial” is intended to mean in a radial direction relative to the turbine axis.

In one embodiment, a skin segment 36' can be used to cover a leading edge region 40 of the airfoil 12, which includes the leading edge 22. Alternatively or in addition, a skin segment 36' can be used to cover the trailing edge region 42 of the airfoil 12, which includes the trailing edge 24. Alternatively or in addition, there can be a skin segment 36' covering at least a portion of the pressure side 18 of the airfoil 12 and/or a skin segment 36' covering at least a portion of the suction side 20 of the airfoil 12. When a plurality of skin segments 36' are provided, the skin segments 36' can substantially cover the entire substructure 34 that would otherwise be exposed to hot gases flowing through the turbine section. However, in some instances, a portion of the airfoil 12 may still be exposed. In still another embodiment, the substructure 34 can be covered by a single, continuous skin 36.

When a plurality of skin segments 36' is provided, neighboring skin segments 36' can substantially abut each other, which is intended to include actual abutment and slight variations therefrom. In such case, a seam 44 can be formed along the interface 46 between the two skin segments 36'. The seam 44 can extend in the generally radial direction.

The thickness of the skin segments 36' can be substantially identical. However, in some instances, at least one of the skin segments 36' can have a different thickness. For instance, the thickness of the skin segment 36' associated with the leading edge region 40 can be thicker than the other skin segments 36', as shown in FIGS. 2 and 3. The leading edges of airfoils are typically more prone to foreign object damage, erosion, and coating spallation. Thus, a leading edge skin segment or a skin having an increased thickness in a leading edge region thereof may be more robust under these conditions (e.g., longer oxidation life after spallation of any thermal or environmental barrier coating). Further, there can be variations in the thickness of each individual skin segment 36'.

According to aspects of the invention, the external skin 36 can be made of any suitable high temperature capable material. For example, the skin 36 can be made of an oxide dispersion strengthened ("ODS") alloy. For instance, the skin 36 can be made of PM2000 (which is available from Plansee SE, Reutte, Austria), MA956 (which is available from Special Metals Corporation, Huntington, West Virginia), or MA758 (which is available from Special Metals Corporation, Huntington, West Virginia). Alternatively, the skin 36 can be made of a refractory alloy, such as Niobium (Nb), which can have a Niobium Silicide ($NbSi_2$) coating. The skin 36 can also be made of intermetallic materials, such as Niobium Silicide (NbSi) intermetallic or Nickel Aluminide (NiAl) intermetallic. The skin 36 can also be made of a ceramic matrix composite (CMC) material. For instance, the skin 36 can be made of Silicon Carbide (SiC/SiC) CMC material (e.g, HiPerComp™ which is available from GE Energy Composites of Newark, Delaware, or S300 which is available from COI Ceramics, Inc., San Diego, Calif.). The skin 36 can be made of a material that has a higher melting point than the material of the substructure 34.

When multiple skin segments 36' are provided, the skin segments 36' can be made of the same material. Alternatively, at least one of the skin segments 36' can be made of a different material from the material of the other skin segments 36'.

Figure 4:
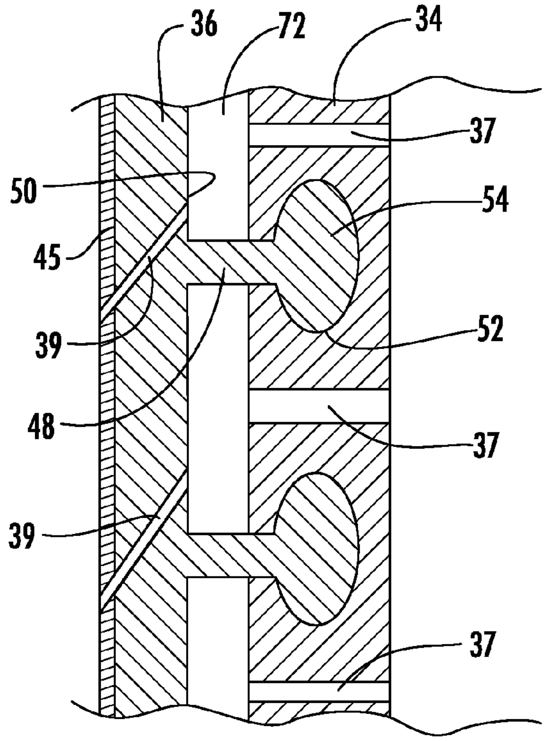
FIG. 4 is a close up cross-sectional view of an interface between an exterior skin and a substructure according to aspects of the invention, showing the skin having a plurality of protrusions with ends that are substantially matingly received in recesses in the substructure.

At least a portion of each skin segment 36' can be coated with a thermal barrier coating (TBC) and/or an environmental barrier coating (EBC) 45 (FIG. 4). EBCs are critical for oxidation and corrosion protection of many of these high temperature materials (for example, refractory suicides and silicates are used for oxidation protection of Nb-alloys and SiC-based CMCs, respectively). TBCs can be used independently or in conjunction with EBCs, depending on the substrate material. ODS alloys have been shown to be compatible with thermal barrier coatings because they have a good oxidation behavior (forming uniform, adherent, and protective oxide scale). Further, ODS alloys have a lower coefficient of thermal expansion, thereby minimizing the potential for problems due to differences in thermal expansion or contraction with the environmental barrier coating.

In one embodiment, the skin 36 can be formed in any suitable manner. For instance, the skin 36 can be made by machining. In one embodiment, the skin 36 can be made before the substructure 34. In such case, the substructure 34 can be cast into the skin 36. Such a process is generally referred to as "bi-casting." Examples of bi-casting are disclosed in U.S. Pat. Nos. 3,669,177; 3,732,031; 3,878,880; 4,008,052; 4,195,683; 4,489,469; 4,494,287; 4,538,331; 4,592,120; 4,728,258; 4,869,645; 4,955,423; 4,961,459; 4,987,944; 5,069,265; 5,181,550; 5,241,737; 5,241,738; 5,263,530; 5,290,143; 5,332,022; 5,332,360; 5,377,742; 5,678,298; 5,797,725; 5,981,083; 6,409,473; 7,045,220; 7,284,590, and in U.S. Patent Application Publication No. 2006/0239825. Each of these references is incorporated herein by reference. Generally, bi-casting involves forming a first piece (the skin 36 in this case) and casting a second piece (the substructure 36 in this case) around it or onto it with some mechanical interlocking joint defined between the two pieces. The options for such joint geometries are numerous, some of which are described below.

The skin 36 can be attached to the substructure 34 in any of a number of ways. For instance, the skin 36 and the substructure 34 can be attached by a plurality of attachment members extending between the skin 36 and the substructure 34. The attachment members can be coated with an insulating material, such as a ceramic, to minimize any thermal differentials between the components and/or to prevent any undesired metallurgical bonding.

Figure 5:
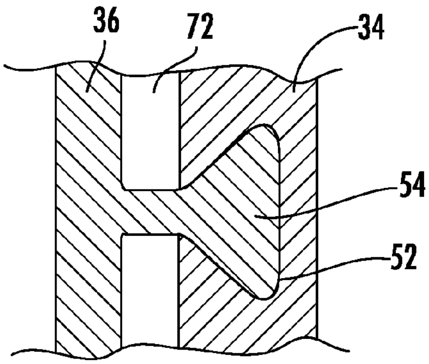
FIG. 5 is a close up cross-sectional view of an alternative interface between the exterior skin and the substructure according to aspects of the invention, showing a skin protrusion having an end configured as a male dovetail that is substantially matingly received in a female dovetail recess in the substructure.
Figure 6:
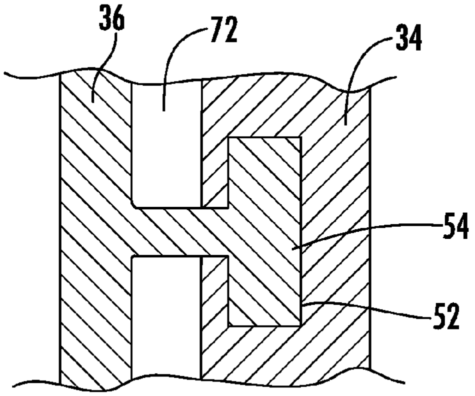
FIG. 6 is a close up cross-sectional view of an alternative interface between the exterior skin and the substructure according to aspects of the invention, showing a skin protrusion having a T-shaped end that is substantially matingly received in a recess in the substructure.

In one embodiment, the attachment members can be defined by protrusions 48 extending from an inner surface 50 of the skin 36, as is shown in FIG. 4. The protrusions 48 can be adapted for interlocking engagement with the substructure 34. For instance, at least a portion of one or more of the protrusions 48 can be substantially matingly received in a respective recess 52 in the substructure 34. In one embodiment, an end 54 of each protrusion 48 can be shaped as a male dovetails to be received in mating female dovetails in the skin 36 and the substructure 34, as shown in FIG. 5. Alternatively, the end 54 of each protrusion 48 can be generally spherical (FIG. 4) or t-shaped (FIG. 6), just to name a few possibilities. The protrusions 48 can be substantially identical or at least one protrusion 48 can be different from the other protrusions 48 in one or more respects. The recesses 52 can be formed as a result of the substructure 34 being bi-cast onto the skin 36.

Figure 7:
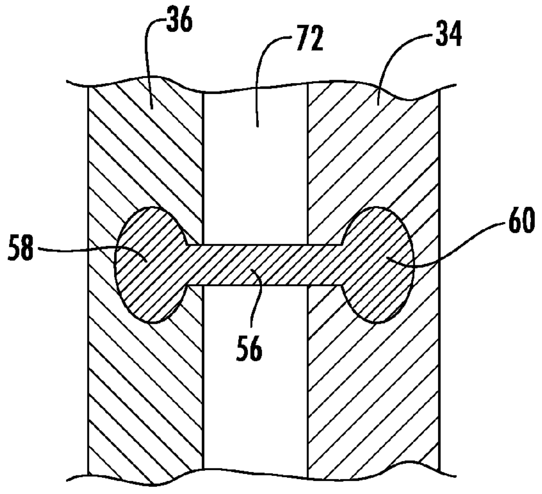
FIG. 7 is a close up cross sectional view of an interface between a skin member and a substructure according to aspects of the invention, showing the skin and substructure being attached by a separate connector.

Alternatively, the attachment members can be defined by a connector 56, which is completely separate from the skin 36 and the substructure 34, as is shown in FIG. 7. In such case, the attachment members can engage both the skin 36 and the substructure 34 by interlocking engagement. To that end, a first end 58 and a second end 60 of the connectors 56 can be adapted for interlocking engagement with the skin 36 and the substructure 347 respectively. In one embodiment, the first and second ends 58, 60 can be shaped as male dovetails to be received in mating female dovetails in the skin 36 and the substructure 34. Alternatively, the first and second ends 58, 60 can be spherical or t-shaped to be received in mating recesses in the skin 36 and the substructure 34. The first and second ends 58, 60 can be identical or they can be different from each other. The connectors 56 can be made of any suitable material. The connectors 56 can have a high melting temperature so as to be able to withstand any potential exposure to the turbine environment. In cases where the substructure 34 is bi-cast onto these connectors 56, the connector material may be chosen so as to withstand contact with the molten alloy without remelting or undesired reactions. The connectors 56 can be substantially identical or at least one connector 56 can be different from the other connectors 56 in one or more respects.

Figure 8:
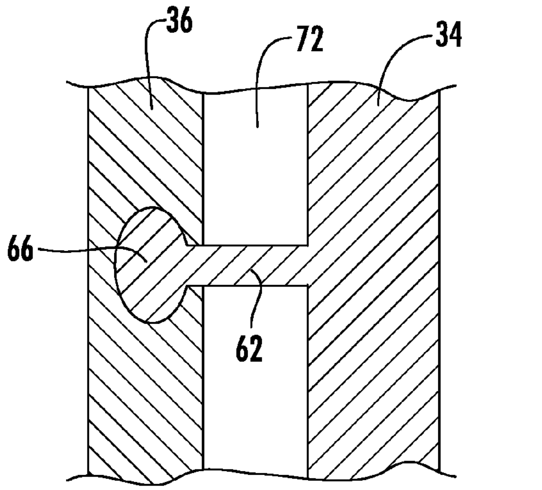
FIG. 8 is a close up cross-sectional view of an interface between an exterior skin and a substructure according to aspects of the invention, showing the substructure having a protrusion with an end that is substantially matingly received in a recess in the substructure.
Figure 9:
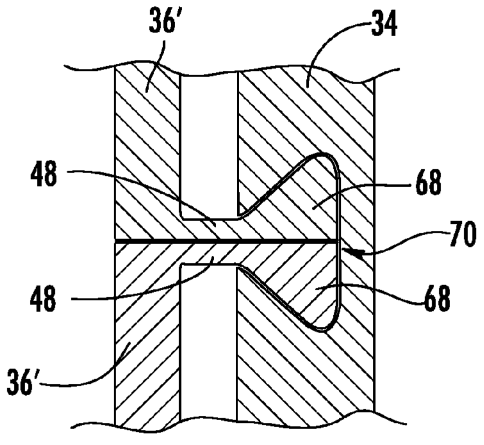
FIG. 9 is a close up cross-sectional view of an interface between two skin segments and the substructure according to aspects of the invention, showing the protrusions from the skin segments collectively forming a male dovetail end that is substantially matingly received in a female dovetail recess in the substructure.

In still another embodiment, the attachment members can be defined by protrusions 62 extending from the outer peripheral surface 38 of the substructure 34, as is shown in FIG. 8. The protrusions 62 can be adapted for interlocking engagement with the skin 36. For instance, at least a portion of one or more of the protrusions 62 can be substantially matingly received in a respective recess 64 in the skin 36. In one embodiment, an end 66 of each protrusion 62 can be shaped as male dovetails to be received in mating female dovetails in the skin 36 and the substructure 34. Alternatively, the end 66 of each protrusion can be spherical or t-shaped, just to name a few possibilities. The protrusions 62 can be substantially identical or at least one protrusion 62 can be different from the other protrusions 62 in one or more respects.

It should be noted that any of the above embodiments can be achieved by bi-casting. In some instances, it should be noted that two attachment members can share the same recess. For example, referring to FIG. 9, two neighboring skin members can include protrusions 48 shaped as a half male dovetail 68. The two protrusions 48 can collectively define a full male dovetail 70 and can be received together in a single female recess 52 in the substructure 34. Of course, it will be understood that such an arrangement used in connection with any embodiment of the attachment members, including any of those described above.

It will be appreciated that the above manners of attachment can, in some instances, allow the skin 36 and the substructure 36 to be thermally decoupled because there is no metallurgical or permanent joint between them. However, in some instances, such as when the substructure 34 is used to help cool the skin, then metallurgical bonding may be employed.

The skin 36 can be spaced from the outer peripheral surface 38 of the substructure 34. As a result of this spacing, a cavity 72 can be formed between the external skin 36 and the substructure 34. The cavity 72 can extend about at least a portion of the substructure 34. Any suitable coolant, such as air, can be supplied to the cavity 72 such that the coolant is circulated between external skin 36 and the substructure 34. The coolant source can be internal or external to the engine. In one embodiment, a coolant can be supplied from one of the radial ends of the airfoil 12. The coolant can be supplied directly to the cavity 72. Alternatively or in addition, the coolant can be supplied to the hollow interior of the substructure 34. The coolant can flow to the cavity 72 by way of passages 37.

The coolant can be exhausted from the airfoil 12 in any suitable manner. In one embodiment, there can be one or more passages 39 extending through the skin 36. The passages 39 can be in fluid communication with the exterior of the airfoil 12 as well as with the cavity 72. The passages 39 can have any appropriate size and cross-sectional shape. The passages 39 can be angled so that any coolant exiting does not cause substantial turbulence in the hot gas flow in the turbine. Any number of passages 39 can be provided. When multiple skin segments 36' are provided, some of the skin segments 36' may include the passages 39 while other skin segments 36' may not.

Alternatively, for skins 36 made of high temperature capable materials, radiation cooling of the substructure 34 is also possible. For example, U.S. Pat. No. 6,767,659, which is incorporated herein by reference, describes a CMC article having radiation cooling as a means for temperature control. In such cases, the internal pressure margin required can be reduced, thus minimizing the stresses on the skin 36.

Alternatively or in addition to the skins 36 described above, one or more skins 74 can be applied to the gas path faces 30, 32 of the inner and/or outer shroud 14, 16 in accordance with aspects of the invention. In such case, the substructure 34 can be defined by the inner and/or outer shroud 14, 16. The discussion above regarding the airfoil skins 36 is equally applicable to the shroud skins 74. The shroud skins 74 can be placed in any suitable area on the shrouds 14, 16. In one embodiment, the entire gas path face 30, 32 of at least one of the shrouds 14, 16 can be covered by one or more skins 74. The skin 74 can be spaced from the gas path faces 30, 32 of the respective shrouds 14, 16 such that a cavity 73 is defined therebetween.

Figure 10:
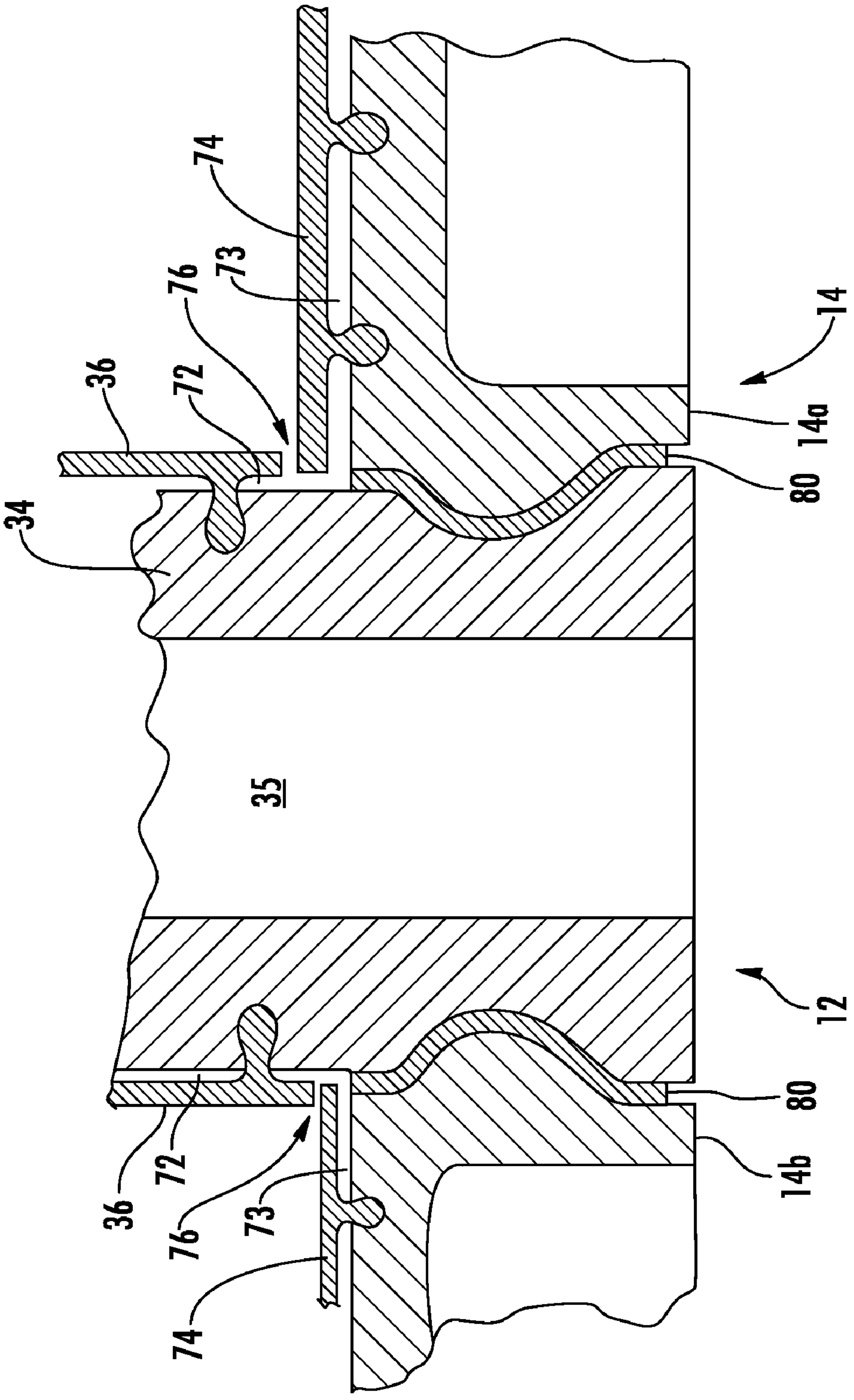
FIG. 10 is a side elevation cross-sectional view of an interface between an airfoil and shroud according to aspects of the invention.

FIG. 10 shows an instance in which the vane 10 includes both shroud skins 74 and airfoil skins 36. At the end regions 26, 28 of the airfoil 12 where the airfoil 12 transitions to the shrouds 14, 16, the airfoil skins 36 and the shroud skins 74 can be proximate each other. In one embodiment, sufficient clearance can be provided between the airfoil skins 12 and the shroud skins 74 to avoid interferences, as is shown in FIG. 10. Alternatively, the skin can be one continuous formed structure (that is, the airfoil skin 36 and the shroud skin 74 can be a unitary structure) into which a unitary substructure 34 for both airfoil 12 and shrouds 14, 16 (not shown) can be cast.

When the airfoil 12 and the shrouds 14, 16 are separate, particularly when the shrouds 14, 16 are made from two pieces that collectively engage the airfoil 12, aspects of the invention can be applied to the interface 76 between the shrouds 12, 14 and the airfoil 12. Referring to FIG. 10, the airfoil 12 is attached to the inner shroud 14. While this description will concern the inner shroud 14, it will be understood that the description can apply equally to the outer shroud 16. The inner shroud 14 can include a first half **14*a* and a second half 14*b*. The shroud halves 14*a*, 14*b* can be attached to the airfoil 12 by interlocking mechanical engagement. In one embodiment, the airfoil can have a reduced region, so as to form a "wasp-waist" like contour. The mating ends of the shrouds 14*a*, 14*b* can be contoured for substantial mating engagement with the recesses. Alternatively or in addition to a mechanical joint, the shroud halves 14*a*, 14*b* and the airfoil 12 can be held together by one or more fasteners, such as bolts. Alternatively or in addition, an interface 76 between the shroud halves 14*a*, 14*b* and the airfoil 12 can include a material 80 for sealing and/or load transfer. The material 80 can be a melt filler material, such as a low melting alloy or powder metal injection material. The material 80 can be a braze paste, such as Liburdi braze paste. Alternatively, the shroud halves 14*a*, 14*b* and the airfoil 12** can be joined by bi-casting the filler material.

In light of the above, it will be appreciated that a turbine vane in accordance with aspects of the invention can provide numerous advantages. For instance, because of the refractory material skins, there can be reduced cooling air usage for the vane. As a result, the cooling air can be used for other beneficial purposes in the engine. Also, in ultra high temperature environments, the risk of spallation of any environmental barrier coating can be minimized. These and other advantages can be realized in accordance with aspects of the invention.

The foregoing description is provided in the context of one possible application for the system according to aspects of the invention. While the above description is made in the context of a turbine vane, it will be understood that the system according to aspects of the invention can be readily applied to any turbine engine component, particularly stationary components. Thus, it will of course be understood that the invention is not limited to the specific details described herein, which are given by way of example only, and that various modifications and alterations are possible within the scope of the invention as defined in the following claims.

What is claimed is:

1. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein the external skin is made of a plurality of skin segments; and wherein one of the plurality of skin segments covers a leading edge region of the airfoil, wherein each of the skin segments has an associated thickness, wherein the thickness of the skin segment that covers the leading edge region of the airfoil is greater than the thickness of the other skin segments.

2. The turbine vane of claim 1 wherein at least one passage extends through the thickness of the skin segment that covers a leading edge region of the airfoil.

3. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein the external skin is made of one of an oxide dispersion strengthened alloy, a refractory alloy, an intermetallic alloy and a ceramic matrix composite.

4. The turbine vane of claim 3, wherein the external skin covers only a leading edge region of the airfoil.

5. The turbine vane of claim 3, wherein the external skin is made of a plurality of skin segments.

6. The turbine vane of claim 5 wherein the skin segments are substantially adjacent to each other so that a seam is defined therebetween, wherein the seam is elongated in the generally radial direction.

7. The turbine vane of claim 3, wherein the external skin is spaced from the substructure such that a cavity is formed therebetween.

8. The turbine vane of claim 7 wherein the substructure includes a hollow interior, wherein at least one passage extends through the substructure so as to be in fluid communication with the cavity and with the hollow interior.

9. The turbine vane of claim 3, wherein the attachment members are protrusions extending from an inner surface of the skin, wherein each protrusion has an end that interlockingly engages the substructure.

10. The turbine vane of claim 3, wherein the attachment members are protrusions extending from an inner surface of the substructure, wherein each protrusion has an end that interlockingly engages the skin.

11. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein the attachment members are connectors that are separate from the skin and the substructure, each connector having an opposing first end and second end, wherein the first end interlockingly engages the skin, and wherein the second end interlockingly engages the substructure.

12. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein an end of a first attachment member of a first skin segment and an end of a second attachment member of a second neighboring skin segment are received together in a common recess in one of the skin and the substructure.

13. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein at least a portion of the skin is coated with one of a thermal barrier coating and an environmental barrier coating.

14. The turbine vane of claim 3, wherein the inner shroud has a gas path face and the outer shroud has a gas path face, wherein an external skin is attached to at least one of the inner shroud and the outer shroud such that the gas path face of the respective shroud is at least partially covered by the external skin.

15. A turbine vane comprising:

an inner shroud;

an outer shroud; and an airfoil extending between the inner and outer shrouds, the airfoil having an inner end region and an outer end region, the airfoil transitioning to the inner shroud in the inner end region and transitioning to the outer shroud in the outer end region, the airfoil including a substructure and an external skin attached to the substructure by a plurality of attachment members extending therebetween, wherein each attachment member interlockingly engages at least one of the substructure and the external skin;

wherein at least one of the inner shroud and the outer shroud is made of a first half shroud and a second half shroud, wherein the first half shroud and the second half shroud collectively engage and mechanically interlock a respective one of the end regions of the airfoil.

16. A turbine vane comprising:

an inner shroud having a gas path face;

an outer shroud having a gas path face; and an airfoil extending between the inner and outer shrouds, the airfoil having an inner end region and an outer end region, the airfoil transitioning to the inner shroud in the inner end region and transitioning to the outer shroud in the outer end region, wherein an external skin is attached to at least one of the inner shroud and the outer shroud such that the gas path face of the respective shroud is at least partially covered by the external skin;

wherein the external skin and the substructure are joined by a plurality of attachment members extending therebetween, wherein each attachment member interlockingly engages at least one of the respective shroud and the external skin.

17. The turbine vane of claim 16, wherein the external skin is spaced from the gas path face such that a cavity is formed therebetween.

18. The turbine vane of claim 1, wherein the external skin is spaced from the substructure such that a cavity is formed therebetween.

19. The turbine vane of claim 1, wherein the inner shroud has a gas path face and the outer shroud has a gas path face, wherein an external skin is attached to at least one of the inner shroud and the outer shroud such that the gas path face of the respective shroud is at least partially covered by the external skin

20. The turbine vane of claim 13, wherein the inner shroud has a gas path face and the outer shroud has a gas path face, wherein an external skin is attached to at least one of the inner shroud and the outer shroud such that the gas path face of the respective shroud is at least partially covered by the external skin.

* * * * *